United States Patent
Touitou et al.

(10) Patent No.: US 7,610,622 B2
(45) Date of Patent: Oct. 27, 2009

(54) SUPPORTING OPTIONS IN A COMMUNICATION SESSION USING A TCP COOKIE

(75) Inventors: Dan Touitou, Ramat Gan (IL); Michael Zayats, Netanya (IL); Rajan Goyal, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 523 days.

(21) Appl. No.: 11/348,977

(22) Filed: Feb. 6, 2006

(65) Prior Publication Data

US 2007/0185998 A1     Aug. 9, 2007

(51) Int. Cl.
*G06F 15/173*     (2006.01)
(52) U.S. Cl. ...................................................... 726/22
(58) Field of Classification Search .................... 726/22; 709/223, 229
See application file for complete search history.

(56) References Cited

U.S. PATENT DOCUMENTS

| | | | | |
|---|---|---|---|---|
| 6,772,334 B1 * | 8/2004 | Glawitsch | ................... | 713/153 |
| 6,961,759 B2 * | 11/2005 | Brown et al. | ................. | 709/217 |
| 7,010,605 B1 * | 3/2006 | Dharmarajan | ............... | 709/227 |
| 7,043,759 B2 * | 5/2006 | Kaashoek et al. | ............. | 726/25 |
| 7,058,974 B1 * | 6/2006 | Maher et al. | ................... | 726/13 |
| 7,124,440 B2 * | 10/2006 | Poletto et al. | ................. | 726/23 |
| 7,149,791 B2 * | 12/2006 | Sears et al. | .................. | 709/219 |
| 7,213,264 B2 * | 5/2007 | Poletto et al. | ................. | 726/22 |
| 7,234,158 B1 * | 6/2007 | Guo et al. | ....................... | 726/2 |
| 7,254,133 B2 * | 8/2007 | Govindarajan et al. | ...... | 370/394 |
| 7,269,850 B2 * | 9/2007 | Govindarajan et al. | ........ | 726/22 |
| 7,278,159 B2 * | 10/2007 | Kaashoek et al. | ............. | 726/22 |
| 7,359,958 B2 * | 4/2008 | Sears et al. | .................. | 709/219 |
| 7,398,317 B2 * | 7/2008 | Chen et al. | ................... | 709/229 |

OTHER PUBLICATIONS

André Zúquete, "*Improving The Functionality Of Syn Cookies*", IST / INESC-ID Lisboa, Lisboa, Portugal, http://citeseer.ist.psu.edu/cache/papers/cs/27624/http:zSzzSzwww.gsd.inesc-id.ptzSz~avzzSzpubszCMS02.pdf/zuquete02improving.pdf, 21 pages, 2002.

* cited by examiner

*Primary Examiner*—David Y Eng
(74) *Attorney, Agent, or Firm*—Baker Botts L.L.P.

(57) ABSTRACT

A defender operable to support options in a communication session intercepts a connection request packet sent from a client to a server. The defender identifies a client option combination associated with the client from the connection request packet. The defender establishes a client option index corresponding to the client option combination, and encodes the client option index into a cookie of an acknowledgment packet. The defender then sends the acknowledgment packet to the client.

13 Claims, 2 Drawing Sheets

SUPPORTING OPTIONS IN A COMMUNICATION SESSION USING A TCP COOKIE

TECHNICAL FIELD

This invention relates generally to the field of telecommunications and more specifically to supporting options in a communication session using a TCP cookie.

BACKGROUND

In a denial of service attack, one or more attackers may send packets towards one or more servers, overwhelming the servers so that they are no longer able to serve their legitimate clients. As an example, one or more attackers may send SYN packets towards one or more servers. Transmission Control Protocol (TCP) stacks allocate resources for each SYN packet, so the large number of SYN packets may consume the allocated resources. Accordingly, new legitimate TCP connections may fail to be established. Techniques for handling denial of service attacks, however, do not provide certain functionality that may be used in different situations. It is generally desirable to provide functionality used in different situations.

SUMMARY OF THE DISCLOSURE

In accordance with the present invention, disadvantages and problems associated with previous techniques for supporting options in a communication session may be reduced or eliminated.

According to one embodiment of the present invention, a defender operable to support options in a communication session intercepts a connection request packet sent from a client to a server. The defender identifies a client option combination associated with the client from the connection request packet. The defender establishes a client option index corresponding to the client option combination, and encodes the client option index into a cookie of an acknowledgment packet. The defender then sends the acknowledgment packet to the client.

According to another embodiment of the present invention, a client operable to support options in a communication session records a client option combination associated with the client in a connection request packet. The client sends the connection request packet to a server, which is protected by a defender operable to intercept the connection request packet. The clients receives an acknowledgment packet from the defender. A client option index corresponding to the client option combination is encoded into a cookie of the acknowledgment packet.

Certain embodiments of the invention may provide one or more technical advantages. A technical advantage of one embodiment may be that option combination information may be communicated in a SYN cookie. Communicating option combination information in a SYN cookie may allow for effective communication of an option combination during a handshake confirmation sequence, which may allow for establishing a TCP connection after completion of the handshake confirmation sequence.

Another technical advantage of one embodiment may be that corresponding server and client option combinations may be determined. As a first example, packets may be sniffed to establish the corresponding option combinations. As a second example, a packet may be allowed to be sent from a client to a server, and another packet may be allowed to be sent from the server to the client. The corresponding option combinations may be discovered from the allowed packets.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
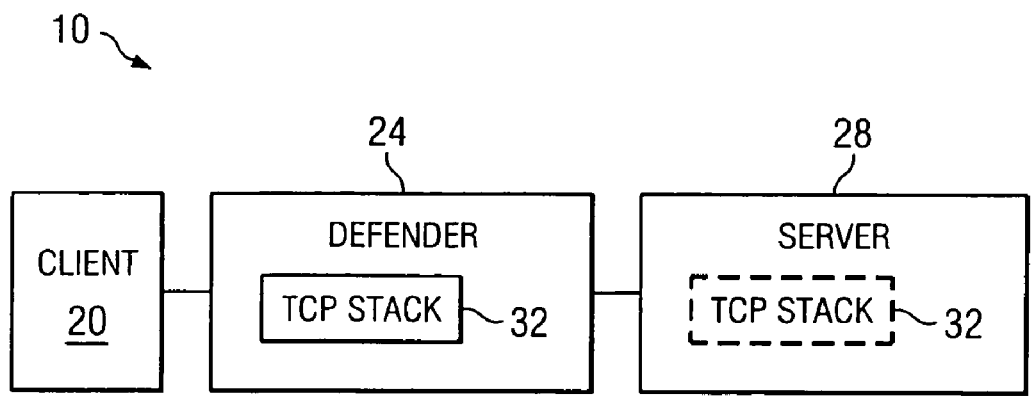
FIG. 1 is a block diagram illustrating one embodiment of a system that includes a defender that communicates option combination information.
Figure 2:
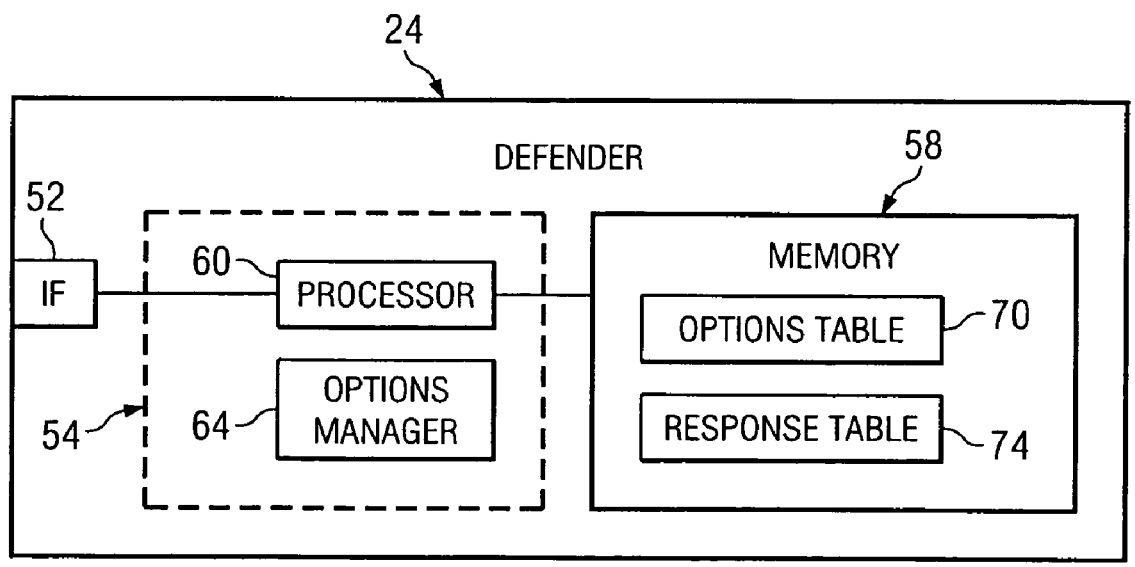
FIG. 2 is a block diagram illustrating one embodiment of a defender that may be used with the system of FIG. 1.
Figure 3:
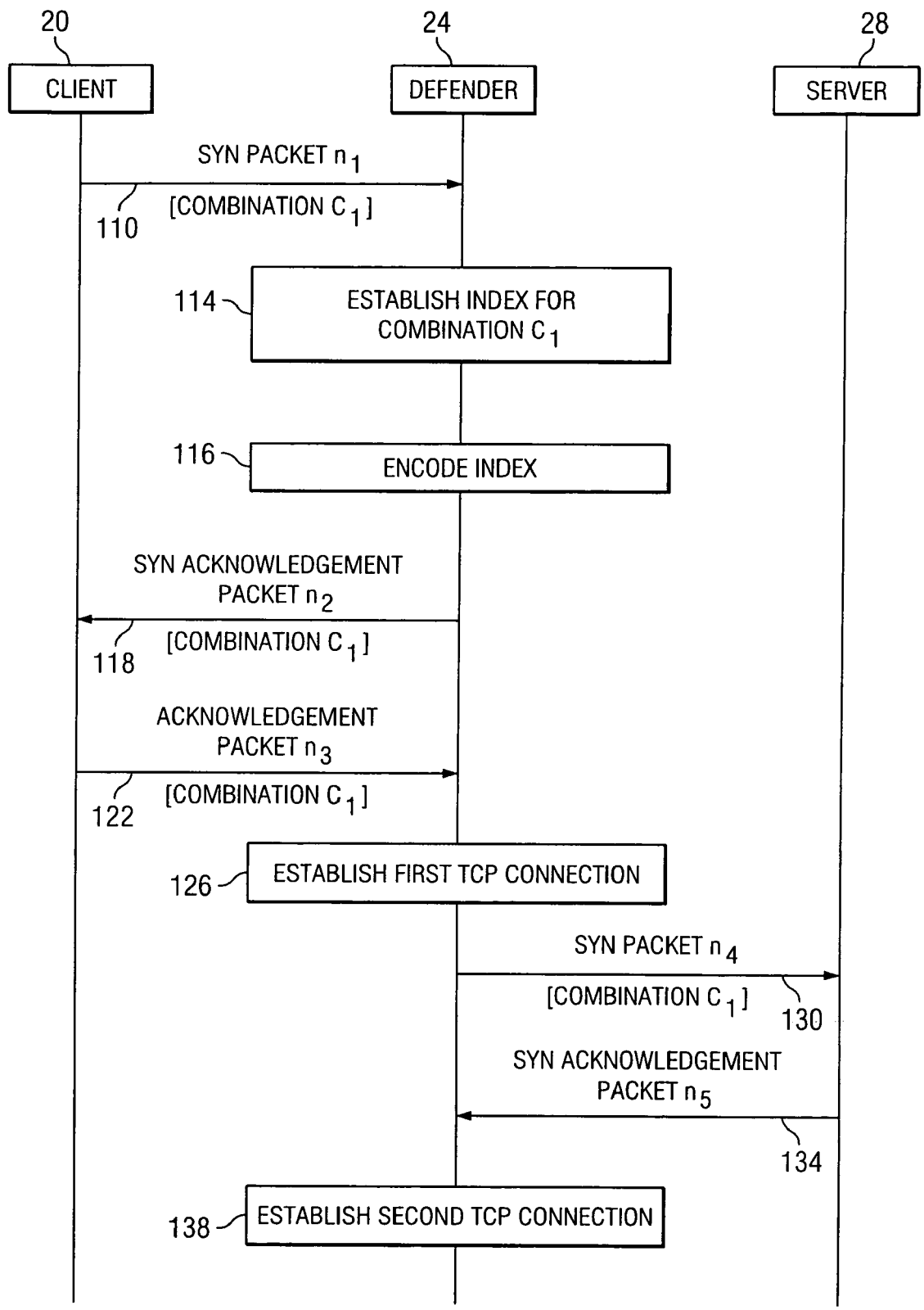
FIG. 3 is a call flow diagram illustrating one embodiment of a method for communicating option combination information.

Embodiments of the present invention and its advantages are best understood by referring to FIGS. 1 through 3 of the drawings, like numerals being used for like and corresponding parts of the various drawings.

FIG. 1 is a block diagram illustrating one embodiment of a system that includes a defender that communicates option combination information. According to the embodiment, the defender facilitates protection of servers from a denial of service attack. The defender may facilitate protection by allocating resources only after a handshake confirmation sequence has been completed. The defender may communicate option combination information during the handshake confirmation sequence. As an example, a portion of a SYN cookie transmitted in a SYN acknowledgment packet during the handshake confirmation sequence may be encoded with option combination information. The communicated option combination information may allow for establishing a TCP connection after completion of the handshake confirmation sequence.

According to the illustrated embodiment, system 10 includes a client 20, a defender 24, and one or more servers 28 coupled as shown. System 10 operates to provide services such as communication sessions to endpoints such as client 20. A communication session may refer to an active communication between endpoints, measured from endpoint to endpoint. Information is communicated during a communication session. Information may refer to voice, data, text, audio, video, multimedia, control, signaling, other information, or any combination of the preceding.

System 10 may communicate information in packets. A packet may comprise a bundle of data organized in a specific way for transmission, and a frame may comprise the payload of one or more packets organized in a specific way for transmission. A packet-based communication protocol such as Internet Protocol (IP) may be used to communicate the packets.

System 10 may utilize communication protocols and technologies to provide the communication sessions. Example communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards.

System 10 includes components such as devices. In general, a device may include any suitable arrangement of components operable to perform the operations of the device, and may comprise logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

System 10 may include a communication network that allows devices to communicate with other devices. A communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

Client 20 represents any suitable device operable to communicate with system 10 and obtain services from server 28. Client 20 may comprise, for example, a computer, a telephone, a personal digital assistant, a server, or any other device operable to communicate with system 10.

Defender 24 operates to protect servers 28 from attacks such as denial of service attacks. A denial of service attack may refer to a situation in which one or more attackers send packets towards servers 28, overwhelming servers 28 so that they are no longer able to serve their legitimate clients 20. As an example, one or more attackers may send SYN packets towards one servers 28.

Defender 24 may represent any suitable device operable to protect servers 28 from attacks. For example, defender 24 may represent a firewall, an intrusion protection system (IPS), a load balancer, a distributed denial of service guard, or other suitable device operable to protect servers 28 from attacks.

According to the illustrated embodiment, defender 24 includes a Transmission Control Protocol (TCP) stack 32. TCP stack 32 may facilitate protection of defender 24 by allocating resources only after a handshake confirmation sequence has been completed. According to the embodiment, TCP stack 32 may communicate option combination information during the handshake confirmation sequence. As an example, a portion of a SYN cookie transmitted in a SYN acknowledgment packet during the handshake confirmation sequence may be encoded with option combination information.

According to the embodiment, TCP stack 32 represents a protocol stack. A protocol stack may refer to a list of internal instructions executed by a computer, which may be expressed as a set of data storage locations that may be accessed in sequence. According to the illustrated embodiment, TCP stack 32 is located at defender 24. TCP stack 32, however, may be located at any suitable location, for example, at server 28.

According to the embodiment, TCP stack 32 performs a handshake confirmation sequence. A handshake confirmation sequence may refer to any suitable sequence of messages transmitted between any suitable devices in order to confirm that a sender of a packet is a legitimate sender. According to one example, a handshake confirmation sequence may include a SYN packet sent from a sender to defender 24, a first SYN acknowledgment packet for the SYN packet sent from defender 24 to the sender, and an acknowledgment packet for the first SYN acknowledgment packet sent from the sender to defender 24. A SYN packet may refer to a connection request packet that includes a SYN bit that is used to synchronize sequence numbers of packets sent from a sender to a defender. A SYN acknowledgment packet may refer to a packet that is sent in response to a SYN packet to indicate that the SYN packet has been received and to synchronize packets sent from a defender to a sender.

According to the example, a sender sends a SYN packet to defender 24. In response, defender 24 sends a SYN acknowledgment packet back to the sender to indicate receipt of the SYN packet. The SYN acknowledgment packet may include a SYN cookie that can be generated only by defender 24. A cookie may refer to an identifier, for example, a number, that defender 24 may use to identify a client 20. The cookie may be included in any suitable field of the first SYN acknowledgment packet, for example, the initial sequence number field. The cookie may be generated in any suitable manner, for example, by a cryptographic method.

In response to receiving the SYN acknowledge packet, the sender sends an acknowledgement packet to indicate receipt of the SYN acknowledgment packet. The acknowledgement packet also includes the cookie, which defender 24 may use to confirm that the sender is a legitimate client 20.

According to one embodiment, TCP stack 32 may communicate option combination information during the handshake confirmation sequence. An option of a device may refer to a required or preferred parameter for communication with the device, and may refer to a TCP option. An option combination of a device may refer to a set of one or more options of the device.

Examples of TCP options include a maximum segment size option, a window scale option, a selective acknowledgment permitted option, a selective acknowledgment option, an alternate checksum request option, an alternate checksum option, other option, or any combination of the preceding. A maximum segment size option is used to specify the size of the largest segment that the sender can receive. A window scale option is used to designate a window size. A selective acknowledgment permitted option is used to specify whether the sender supports a selective acknowledgment feature. A selective acknowledgment option is used to designate that non-contiguous blocks of data that have been received. An alternate checksum option is used to request that a checksum generation algorithm other than the standard TCP algorithm. An alternate checksum option is used to store checksum value needed to implement an alternate checksum is too large to fit in the standard checksum field.

TCP stack 32 may communicate option combination option combinations in any suitable manner. According to one embodiment, a portion of the SYN cookie may be encoded with an option combination. Example embodiments for communicating option combinations are described in more detail with reference to FIGS. 2 and 3.

TCP stack 32 may perform other suitable operations. For example, TCP stack 32 may maintain a TCP state that tracks the packets that have been sent. For example, a "SYN sent" state may indicate that a SYN packet has been sent, and a "SYN received" state may indicate that a SYN packet has been received. A "SYN acknowledgment sent" state may indicate that a SYN acknowledgment packet has been sent, and a "SYN acknowledgment received" state may indicate that a SYN acknowledge packet has been received.

Server 28 represents a device that provides a service to clients 20. Server 28 may represent any suitable server, for example, an origin server, a proxy server, a gateway server, or a tunnel.

Modifications, additions, or omissions may be made to system 10 without departing from the scope of the invention. The components of system 10 may be integrated or separated according to particular needs. For example, TCP stack 32 may be located at server 28 instead of defender 24. Moreover, the operations of system 10 may be performed by more, fewer, or other modules. Additionally, operations of system 10 may be performed using any suitable logic. As used in this document, "each" refers to each member of a set or each member of a subset of a set.

FIG. 2 is a block diagram illustrating one embodiment of a defender that may be used with the system of FIG. 1. According to the embodiment, defender 24 facilitates protection of servers 28 from denial of service attacks and communicates option combination information. The protection of servers and communication of option combination information may be performed by a TCP stack, such as TCP stack 32 of FIG. 1.

According to one embodiment of operation, defender 24 may communicate option combination information during a handshake confirmation sequence. As an example, a portion of a SYN cookie transmitted in a SYN acknowledgment packet during the handshake confirmation sequence may be encoded with option combination information. The communicated option combination information may allow for establishing a TCP connection after completion of the handshake confirmation sequence.

According to the illustrated embodiment, defender 24 includes an interface 52, logic 54, and memory 58 coupled as shown. Logic includes a processor 60 and an options manager 64, and memory 58 stores an options table 70 and a response table 74.

Options manager 64 manages option combination information. According to one embodiment, an option combination may be associated with a device identifier and an index. A device identifier uniquely identifies the device that uses the option combination. The index may be encoded in a cookie to communicate option combination information that describes the option combination.

Option combination information includes client option combination information and server option combination information. Client option combination information describes option combinations for clients 20, and may be stored by options table 70. According to one embodiment, options table 70 may store client option combinations for which response table 74 stores corresponding server option combinations.

Options table 70 may store the client option combinations in any suitable manner. For example, options table 70 may store a client option combination and a client option combination index. The client option combination index may be encoded in a cookie to communicate the client option combination.

Server option combination information describes option combinations for servers 28, and may associate a client option combination with a server option combination that corresponds to the client option combination. A server option combination corresponds to a client option combination if server 28 would provide the server option combination in response to the client option combination. In response to receiving a SYN packet with a particular client option combination, defender 24 may establish the server option combination that corresponds to the client option combination.

Response table 74 may store the server option combinations in any suitable manner. For example, response table 74 may store a client option combination associated with a server option combination and a server option combination index. The server option combination corresponds to the client option combination.

Corresponding server and client option combinations may be determined in any suitable manner. As a first example, packets that include the corresponding combinations may be sniffed to establish the most used corresponding combinations. In the first example, the most used corresponding combinations may be designated in any suitable manner. As a first instance, the most used corresponding combinations may be the combinations found in greater than 50%, 75%, or 90% of the packets. As a second instance, the most used corresponding combinations may be the top 50 or fewer, 40 or fewer, 30 or fewer, or 20 or fewer, combinations found in the packets. In certain situations where the option combinations are a function of the operating system, approximately 90% of the SYN packets use under 40 different option combinations.

As a second example, a minimal number of packets may be allowed between client 20 and server 28, and options manager 64 may read the corresponding option combinations from the allowed packets. In one instance, client 20 sends a packet to server 28, and options manager 64 reads the client option combination from the allowed packet. Server 28 sends a response packet, and options manager 64 reads the corresponding server option combination from the allowed response packet. According to one embodiment, options manager 64 use this technique to discover corresponding option combinations in real time. According to the embodiment, options manager 64 may discover the option combinations at any suitable time, for example, when a denial of service attack is not occurring.

In the second example, the minimal number may be determined according to the number of packets that can be allowed without creating a denial of service situation. For example, the minimal number of packets may be five or fewer packets, such as three or fewer packets or one packet.

According to one embodiment, options manager 64 may modify options table 70 by adding option combinations to, modifying option combinations of, or deleting option combinations from options table 70, or performing any suitable combination of the preceding. As a first example, options manager 64 may discover an option combination. If options table 70 does not include the discovered option combination, options manager 64 may add the discovered option combination to options table 70. As a second example, options manager 64 may update the option combinations by discarding combinations that have not been used for a pre-determined time period.

Modifications, additions, or omissions may be made to defender 24 without departing from the scope of the invention. The components of defender 24 may be integrated or separated according to particular needs. Moreover, the operations of defender 24 may be performed by more, fewer, or other modules. Additionally, operations of defender 24 may be performed using any suitable logic.

FIG. 3 is a call flow diagram illustrating one embodiment of a method for communicating option combination information. The method begins at step 110, where client 20 sends a SYN packet having sequence number $n_1$ to defender 24. SYN packet $n_1$, communicates client option combination $C_1$ of client 20. Defender 24 establishes a client option index corresponds to client option combination $C_1$, at step 114. The client option index may be established according to options table 70 that records client options combinations.

Defender 24 encodes the index for client option combination $C_1$ in a SYN acknowledgement packet having sequence number $n_2$ at step 116. The index may be encoded in a SYN cookie of SYN acknowledgement packet $n_2$. If options table 70 does not include the option combination, a default value, for example, zero, may be encoded. If options table 70 does not include the option combination, defender 24 may allow packets to travel between client 20 and server 28 to discover the corresponding option combinations for client 20 and server 28.

Defender 24 sends SYN acknowledgement packet $n_2$ to client 20 at step 118. Defender 24 sends the server option combination in the option part of the SYN acknowledgment packet. The server option combination may be retrieved from response table 74 using the client option combination as a key. That is, defender 24 replies to client 20 with the server option combination that the server would have sent in response the particular client option combination. Client 20 sends an acknowledgement packet having sequence number $n_3$ at step 122. As an example, $n_3$ may be equal to $n_1+1$. Acknowledgement packet $n_3$ includes the encoded index. The index may be encoded in a SYN cookie of acknowledgement packet $n_3$.

In response to receiving the acknowledgement packet $n_3$ from client 20, defender 24 establishes a first TCP connection between client 20 and defender 24. Defender 24 may establish the first TCP connection by determining client option combination $C_1$, from the index encoded in the SYN cookie, and identifying the server option combination $S_1$, that corresponds to client option combination $C_1$. The server option combination $S_1$, may be established according to response table 74 that stores corresponding options combinations. Defender 24 sends a SYN packet having sequence number $n_4$ to server 28 at step 130. As an example, $n_4$ may be equal to $n_1$. SYN packet $n_4$ communicates client option combination $C_1$.

Server 28 sends a SYN acknowledgement packet having sequence number $n_5$ and server option combination $S_3$. According to one embodiment, $S_3$ may be required to be equivalent to $S_1$. If $S_3$ is not equivalent to $S_1$, defender 24 may respond in any suitable manner. As an example, defender 24 may update response table 74 with server option combination $S_3$, and may close the session with client 20 and server 28. When client 20 tries to reopen session to defender 24 by sending a SYN packet, defender 24 may encode server option combination $S_3$ in the SYN acknowledgement packet. If $S_3$ is equivalent to $S_1$, defender 24 establishes a second TCP connection between defender 24 and server 28 at step 138. After establishing the second TCP connection, the method terminates.

Modifications, additions, or omissions may be made to the method without departing from the scope of the invention. The method may include more, fewer, or other steps. Additionally, steps may be performed in any suitable order without departing from the scope of the invention.

Certain embodiments of the invention may provide one or more technical advantages. A technical advantage of one embodiment may be that option combination information may be communicated in a SYN cookie. Communicating option combination information in a SYN cookie may allow for effective communication of an option combination during a handshake confirmation sequence, which may allow for establishing a TCP connection after completion of the handshake confirmation sequence.

Another technical advantage of one embodiment may be that corresponding server and client option combinations may be determined. As a first example, packets may be sniffed to establish the corresponding option combinations. As a second example, a packet may be allowed to be sent from a client to a server, and another packet may be allowed to be sent from the server to the client. The corresponding option combinations may be discovered from the allowed packets.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for supporting options in a communication session, comprising:
  intercepting a connection request packet sent from a client to a server, the connection request packet intercepted by a defender;
  identifying a client option combination of the client from the connection request packet, the client option combination comprising a set of one or more Transmission Control Protocol (TCP) parameters for communication with the client;
  establishing a client option index corresponding to the client option combination, the client option index configured to be encoded into a cookie to communicate the client option combination;
  encoding the client option index into a cookie of an acknowledgment packet in order to provide the client option index to the client; and
  sending the acknowledgment packet to provide to the client the client option index used to communicate the client option combination client in order to facilitate establishing a connection requested by the connection request packet.

2. The method of claim 1, wherein:
  the connection request packet comprises a SYN packet; and
  the acknowledgment packet comprises a SYN acknowledgment packet.

3. The method of claim 1, further comprising:
  establishing a server option combination corresponding to the client option combination, the server option combination associated with the server, the server option combination comprising a set of one or more parameters for communication with the server; and
  sending the established server option combination as a part of the acknowledgment packet.

4. The method of claim 1, further comprising determining a corresponding option combination by:
  sniffing a plurality of packets;
  establishing the client option combination in response to sniffing the plurality of packets; and
  establishing a server option combination corresponding to the client option combination in response to sniffing the plurality of packets, the server option combination comprising a set of one or more parameters for communication with the server.

5. The method of claim 1, further comprising generating a table comprising one or more corresponding option combinations by:
sniffing a plurality of packets;
establishing a plurality of corresponding option combinations in response to sniffing the plurality of packets, a corresponding option combination comprising an established client option combination and a corresponding established server option combination, the server option combination comprising a set of one or more parameters for communication with the server; and
selecting a subset from the plurality of corresponding option combinations.

6. The method of claim 1, further comprising discovering a corresponding option combination by:
allowing an allowable packet from the client to the server;
establishing the client option combination from the allowable packet;
allowing an allowable response packet from the server to the client; and
establishing a server option combination corresponding to the client option combination from the allowable response packet, the server option combination comprising a set of one or more parameters for communication with the server.

7. A defender operable to support options in a communication session, comprising:
an interface operable to:
intercept a connection request packet sent from a client to a server; and
a processor coupled to the interface and operable to:
identify a client option combination of the client from the connection request packet, the client option combination comprising a set of one or more Transmission Control Protocol (TCP) parameters for communication with the client;
establish a client option index corresponding to the client option combination, the client option index configured to be encoded into a cookie to communicate the client option combination;
encode the client option index into a cookie of an acknowledgment packet in order to provide the client option index to the client; and
the interface further operable to:
send the acknowledgment packet to provide to the client the client option index used to communicate the client option combination client in order to facilitate establishing a connection requested by the connection request packet.

8. The defender of claim 7, wherein:
the connection request packet comprises a SYN packet; and
the acknowledgment packet comprises a SYN acknowledgment packet.

9. The defender of claim 7, the processor further operable to:
establish a server option combination corresponding to the client option combination, the server option combination associated with the server, the server option combination comprising a set of one or more parameters for communication with the server; and
send the established server option combination as a part of the acknowledgment packet.

10. The defender of claim 7, the processor further operable to determine a corresponding option combination by:
sniffing a plurality of packets;
establishing the client option combination in response to sniffing the plurality of packets; and
establishing a server option combination corresponding to the client option combination in response to sniffing the plurality of packets, the server option combination comprising a set of one or more parameters for communication with the server.

11. The defender of claim 7, the processor further operable to generate a table comprising one or more corresponding option combinations by:
sniffing a plurality of packets;
establishing a plurality of corresponding option combinations in response to sniffing the plurality of packets, a corresponding option combination comprising an established client option combination and a corresponding established server option combination, the server option combination comprising a set of one or more parameters for communication with the server; and
selecting a subset from the plurality of corresponding option combinations.

12. The defender of claim 7, the processor further operable to discover a corresponding option combination by:
allowing an allowable packet from the client to the server;
establishing the client option combination from the allowable packet;
allowing an allowable response packet from the server to the client; and
establishing a server option combination corresponding to the client option combination from the allowable response packet, the server option combination comprising a set of one or more parameters for communication with the server.

13. A defender operable to support options in a communication session, comprising:
means for receiving a connection request packet from a client, the connection request packet directed to a server;
means for identifying a client option combination of the client from the connection request packet, the client option combination comprising a set of one or more Transmission Control Protocol (TCP) parameters for communication with the client;
means for establishing a client option index corresponding to the client option combination, the client option index configured to be encoded into a cookie to communicate the client option combination;
means for encoding the client option index into a cookie of an acknowledgment packet in order to provide the client option index to the client; and
means for sending the acknowledgment packet to provide to the client the client option index used to communicate the client option combination client in order to facilitate establishing a connection requested by the connection request packet.

* * * * *

UNITED STATES PATENT AND TRADEMARK OFFICE
CERTIFICATE OF CORRECTION

PATENT NO.       : 7,610,622 B2                                                                 Page 1 of 1
APPLICATION NO.  : 11/348977
DATED            : October 27, 2009
INVENTOR(S)      : Touitou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 606 days.

Signed and Sealed this

Twelfth Day of October, 2010

David J. Kappos
*Director of the United States Patent and Trademark Office*